(12) United States Patent
Crass

(10) Patent No.: US 6,441,584 B1
(45) Date of Patent: Aug. 27, 2002

(54) CHARGE MAINTENANCE SYSTEM FOR LEAD-ACID BATTERY

(75) Inventor: Matthew M. Crass, Pleasant Prairie, WI (US)

(73) Assignee: Snap-on Technologies, Inc., Lincolnshire, IL (US)

(*) Notice: Subject to any disclaimer, the term of this patent is extended or adjusted under 35 U.S.C. 154(b) by 0 days.

(21) Appl. No.: 09/729,253

(22) Filed: Dec. 1, 2000

Related U.S. Application Data

(60) Provisional application No. 60/168,606, filed on Dec. 2, 1999.

(51) Int. Cl.[7] .................................................. H02J 7/00
(52) U.S. Cl. ...................................................... 320/131
(58) Field of Search ................................. 320/129, 131, 320/132, 134

(56) References Cited

U.S. PATENT DOCUMENTS

| | | | | |
|---|---|---|---|---|
| 4,080,560 A | * | 3/1978 | Abert ........................... 320/134 |
| 4,163,934 A | | 8/1979 | Lawn ........................... 320/161 |
| 4,191,918 A | | 3/1980 | Nicholls ....................... 320/161 |
| 4,227,141 A | | 10/1980 | Cross ........................... 320/161 |
| 4,745,349 A | | 5/1988 | Palanisamy et al. ......... 320/125 |
| 4,956,597 A | * | 9/1990 | Heavey et al. ............... 320/129 |
| 5,049,803 A | | 9/1991 | Palanisamy .................. 320/132 |
| 5,153,496 A | | 10/1992 | LaForge ....................... 320/131 |
| 5,157,320 A | | 10/1992 | Kuriloff ....................... 320/151 |
| 5,160,880 A | | 11/1992 | Palanisamy .................. 320/106 |
| 5,198,743 A | | 3/1993 | McClure et al. ............. 320/145 |
| 5,218,287 A | | 6/1993 | Chen ............................ 320/106 |
| 5,315,228 A | | 5/1994 | Hess et al. ................... 320/106 |
| 5,319,298 A | | 6/1994 | Wanzong et al. ............ 320/158 |
| 5,396,163 A | | 3/1995 | Nor et al. .................... 320/159 |
| 5,467,005 A | | 11/1995 | Matsumoto et al. ......... 320/148 |
| 5,510,659 A | | 4/1996 | Lewis et al. ................. 307/11 |
| 5,598,086 A | | 1/1997 | Somerville ................... 320/148 |
| 5,621,298 A | | 4/1997 | Harvey ......................... 320/134 |
| 5,640,078 A | | 6/1997 | Kou et al. .................... 320/124 |
| 5,686,817 A | | 11/1997 | Sakoh et al. ................. 320/142 |
| 5,710,506 A | | 1/1998 | Broell et al. ................. 320/145 |
| 5,780,992 A | | 7/1998 | Beard ........................... 320/106 |
| 5,821,736 A | | 10/1998 | Yeon ............................ 320/148 |

* cited by examiner

Primary Examiner—Edward H. Tso
Assistant Examiner—Pia Tibbits
(74) Attorney, Agent, or Firm—Seyfarth Shaw

(57) ABSTRACT

A charge maintenance system for a lead-acid battery includes a charger, a voltage monitor, and a load/switch series combination, all connectable in parallel across the battery terminals, the switch and the charger being under control of a microprocessor. The battery is initially loaded for a predetermined time period, or until the battery voltage drops below an absolute minimum reference level during a loading cycle, and the system stores the lowest battery terminal voltage occurring during the loading cycle. After a predetermined delay following the loading cycle the charger is activated to charge the battery until it reaches a maximum charge level. Then, if the stored lowest battery voltage level is below a predetermined reference level, the loading/charging routine is repeated, otherwise it is not and the battery is considered good. If the stored lowest battery voltage level remains below the threshold for ten consecutive loading cycles, the system indicates that the battery failed the test but could be subject to retest. If the stored lowest battery voltage level is below an absolute minimum reference voltage level after three consecutive loading cycles, the system indicates that the battery is bad and should be discarded.

20 Claims, 2 Drawing Sheets

CHARGE MAINTENANCE SYSTEM FOR LEAD-ACID BATTERY

RELATED APPLICATION

This application claims the benefit of the filing date of copending U.S. Provisional Application No. 60/168,606, filed Dec. 2, 1999.

BACKGROUND

This application relates to battery charging systems and, in particular, to systems for charging, and maintaining the charge level of, lead-acid batteries, particularly thin-film lead acid batteries of the type manufactured by Johnson Controls, Inc., under the designation "Inspira," or by Bolder Technologies, under the designation "Bolder 9/5 sub-C T.F." (Thin Metal Film).

Certain kinds of lead-acid batteries, such as thin-film lead-acid batteries, must be carefully maintained in order to avoid degradation. Thus, fully-charged batteries of this type must have their charge maintained by a trickle charging system when the battery is not in use, otherwise the battery could become inoperable after about of month of non-use. Furthermore, after the battery has been discharged in use, it must be recharged promptly to avoid degradation. Waiting to recharge could result in serious deterioration and, if left too long, the damage could become irreversible.

Batteries which have been degraded through improper maintenance may be difficult to recharge after use. Thus, while they may reach a specified voltage during charge, they may be unable to maintain a suitable voltage under load.

SUMMARY

This application describes an improved battery charging system which avoids the disadvantages of prior systems, while affording additional structural and operating advantages.

An important aspect is the provision of a battery charging system which can improve the performance of lead-acid batteries which have become degraded through improper maintenance.

Another aspect is the provision of a charging system of the type set forth, which can maintain the condition of lead-acid batteries.

Another aspect is the provision of a battery charging system of the type set forth which is of relatively simple and economical construction.

Still another aspect is the provision of a battery charging system of the type set forth which is automatically controllable.

Certain ones of these and other aspects maybe attained by providing a charge maintenance system for a lead-acid battery comprising: a charger circuit adapted to be coupled to the battery for rapid charging thereof, a load and a switching device adapted to be connected in series across the battery, a voltage monitor circuit adapted to be coupled to the battery for monitoring the terminal voltage thereof, and a processor coupled to the charger circuit and to the switching device and to the monitor circuit and responsive to battery terminal voltage for controlling operation of the charger circuit and the switching device, the processor operating under stored program control for subjecting the battery to alternate loading and charging cycles until a predetermined battery voltage criterion is met.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
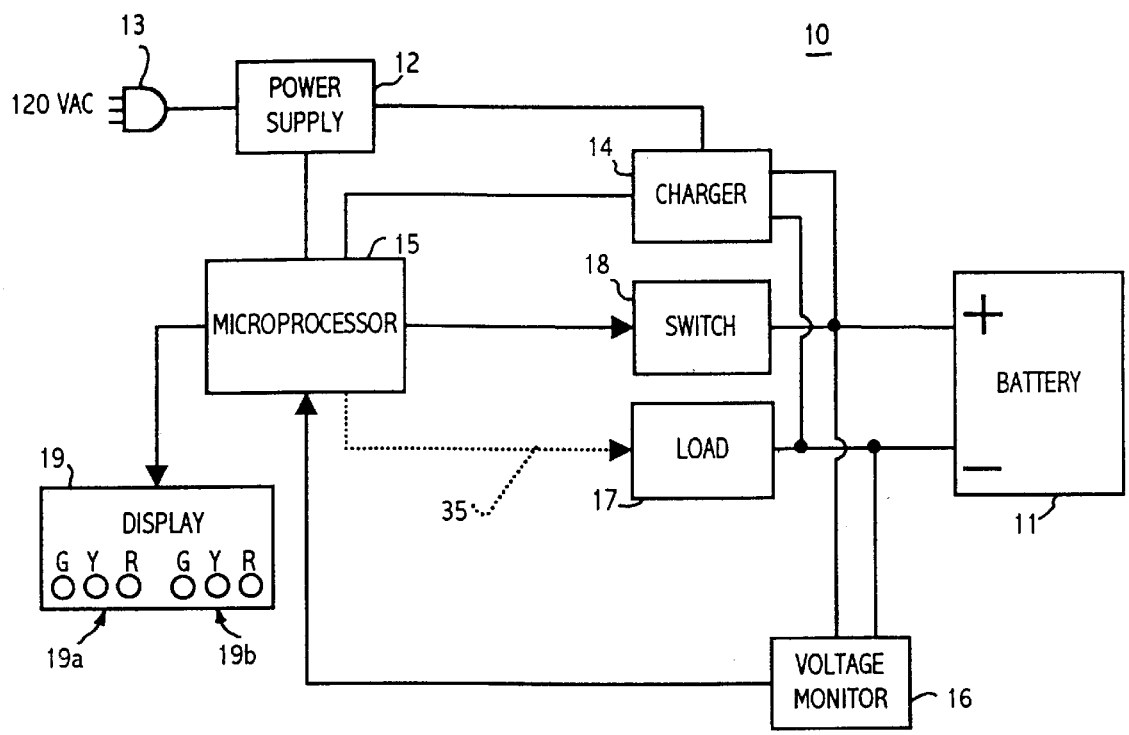
FIG. 1 is a partially schematic and partially functional block diagrammatic view of a battery charging system.

Referring to FIG. 1, there is illustrated a battery charging system, generally designated by the numeral 10, for charging a battery 11, which is preferably a thin-film, lead-acid battery. The charging system 10 includes a power supply 12 which is coupled by a plug 13 to a 120 V AC source. The power supply 12 provides appropriate supply voltages to a battery charger 14 and to a microprocessor 15. The charger 14 may be of a known design, and is coupled across the terminals of the battery 11 for providing charging voltages and currents thereto. More specifically, the charger 14 is designed to provide fast charging of the battery 11.

The system 10 also includes a voltage monitor 16 connected across the battery terminals for monitoring the battery voltage and providing an output signal indicative of that voltage to the microprocessor 15. A load circuit 17 is connected across the battery terminals through a suitable switching circuit 18, which operates under control of the microprocessor 15. A display 19 is preferably also coupled to the microprocessor 19 for displaying suitable messages to the operator of the system.

An operating principle of the system 10 is that maximum battery performance of a lead-acid battery can be maintained, or such a battery which has been severely depleted or degraded can be rejuvenated, by subjecting the battery to one or more controlled discharge/charge cycles. While chargers using a single discharge/charge routine have heretofore been used in connection with nickel cadmium or nickel metal hydride batteries, it has not heretofore been recognized that such a routine can be of value in maintaining and/or rejuvenating lead-acid batteries, nor has repetition of such a routine been heretofore used.

Figure 2:
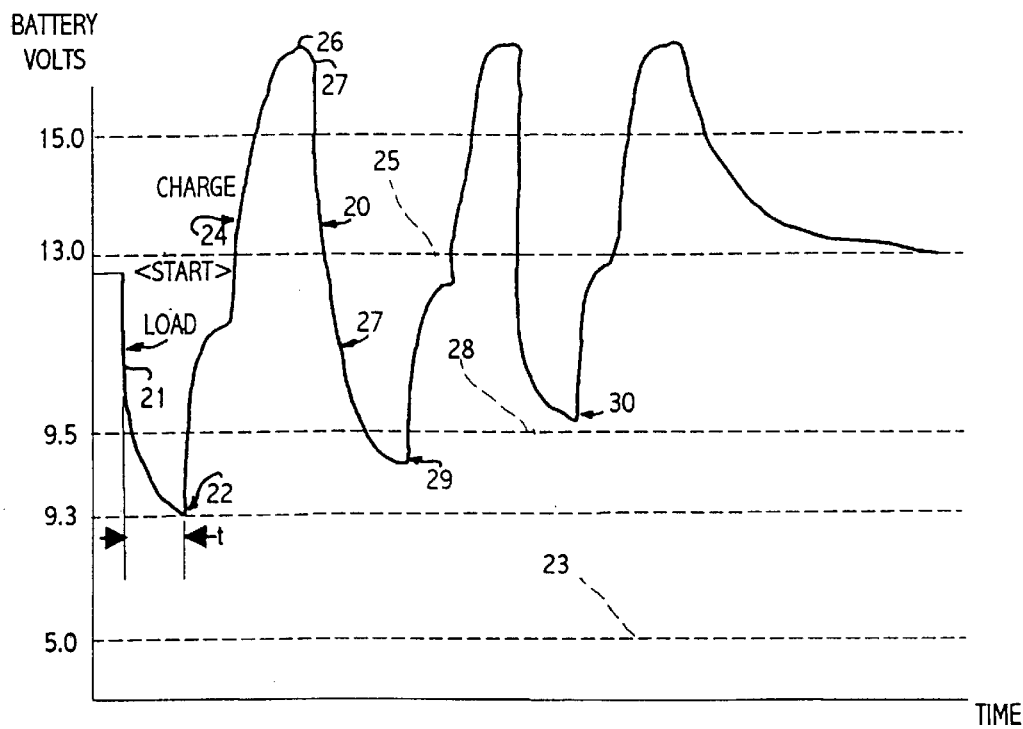
FIG. 2 is a graph of battery voltage versus time illustrating the operation of the charging system of FIG. 1.

Referring now also to FIG. 2, the details of the operation of the system 10 will be described. FIG. 2 illustrates a waveform 20 of the battery output voltage plotted against time during operation of the battery charging system 10. First, the battery 11 is connected to the system 10 in the manner illustrated in FIG. 1 and the system 10 is plugged into the AC source and turned on. Initially, the charger 14 is controlled by the microprocessor 15 and is off. The microprocessor 15 first closes the switch 18 for connecting the load 17 across the battery 11 at "START." The load 17 is selected to draw a heavy current from the battery 11, such as from about 50 amps to about 200 amps, and during this loading the battery voltage drops rapidly, as at 21. The load 17 is applied for a predetermined, relatively short time period t, which may, for example, be from about 10 seconds to about 40 seconds, depending upon the load current, and then the switch 18 is opened, disconnecting the load 17.

The microprocessor 15 senses and stores in associated memory (not shown) the lowest battery voltage reached during loading, this valley being designated 22 in FIG. 2. In the illustrated embodiment, the voltage dropped to 9.3 volts, but it will be appreciated that it could drop as low as a prescribed absolute minimum reference voltage level 23 (which might be from about 8.0 volts down to about 5.0 volts, depending on load chosen), depending upon the condition of the battery. If the voltage drops below the absolute minimum level 23, loading is immediately terminated. Upon termination of loading, either at the end of the prescribed time period t, or by low voltage cut-off, the battery rests for a predetermined time, such as 30 seconds, while an indicator in the display 19, such as an LED array 19*a*, displays the load result (green means passing, yellow means failing voltage criteria, red means unable to maintain absolute minimum voltage). Following the 30-second rest, the microprocessor 15 directs the charger 14 to apply a fast-charging current to the battery 11, as at 24. Typically, the battery 11 will be charged beyond the nominal full-charge voltage level 25, in this case indicated to be 13.0 volts, to a maximum voltage level at 26, which could be as high as about 16.5 volts. It is characteristic of lead-acid batteries that, if charging continues beyond the maximum charge level 26, the battery voltage will begin to drop. The charger 14 senses this drop in voltage at 27 by use of any of a number of techniques, such as detecting the transition of the waveform 20 from a positive slope to a negative slope. At that point, the charger 14 recognizes that the maximum voltage level has been achieved and thereupon terminates charging.

It is a significant aspect of the invention that the system stores a predetermined voltage threshold or reference level 28, in this case 9.5 volts, and compares the minimum voltage level at 22 with the threshold, and the result of that comparison determines the remainder of the charging routine. Thus, if the minimum battery voltage during loading is at or above the threshold, then the system recognizes that no additional conditioning is necessary, whereas if the minimum voltage level during loading is below the threshold, further load/charge cycling is required. After each charging cycle, a determination is made of how to proceed. If the most recent load voltage of the battery did not fall below the threshold level 28, the microprocessor ceases operation, except to display a "final disposition" indication, such as by an LED array 19*b*, which is green to indicate a good battery. If the microprocessor has counted 10 load/charge cycles, in which the battery voltage fell below the threshold level 28, the microprocessor ceases operation, except to display a "final disposition" indication by illuminating a yellow LED to indicate that the battery did not pass. The user can choose to start the program once again, or discard the battery as bad. If the microprocessor has counted at least three load/charge cycles, and in the current loading cycle the battery fell below the absolute minimum voltage level 23, the microprocessor ceases operation, except to display a "final disposition" by illuminating a red LED to indicate that the battery should be discarded without further testing. If none of the three conditions, described above, occurs, then the microprocessor directs switch 18 to reconnect load 17, thus beginning another load/charge cycle.

In the illustrated embodiment, the valley 22 is below the threshold 28, so the system initiates another charge/discharge cycle.

More specifically, the microprocessor 15 reactivates the switch 18 to reconnect the load 17 for another loading cycle, followed by another charging cycle. In this case, the minimum voltage level 29 reached during loading is again below the threshold 28, so a further load/charge cycle is initiated. After the next loading and charging cycle, the minimum voltage reached at 30 is now above the threshold 28. Thus, the microprocessor 15 recognizes that no further conditioning is required. Accordingly, the microprocessor 15 ceases operation, except to display a "final disposition" indication by illuminating a green LED to indicate a good battery, and the battery voltage settles to the nominal full-charge level 25.

It will be appreciated that the actual battery voltage levels being sensed by the voltage monitor 16, as well as other data and messages indicating the general condition of the battery 11 and the current stage of the charging routine, can be displayed to a user on the display 19. If desired, the display 19 may be of a type to also display the waveform 20.

Figure 3:
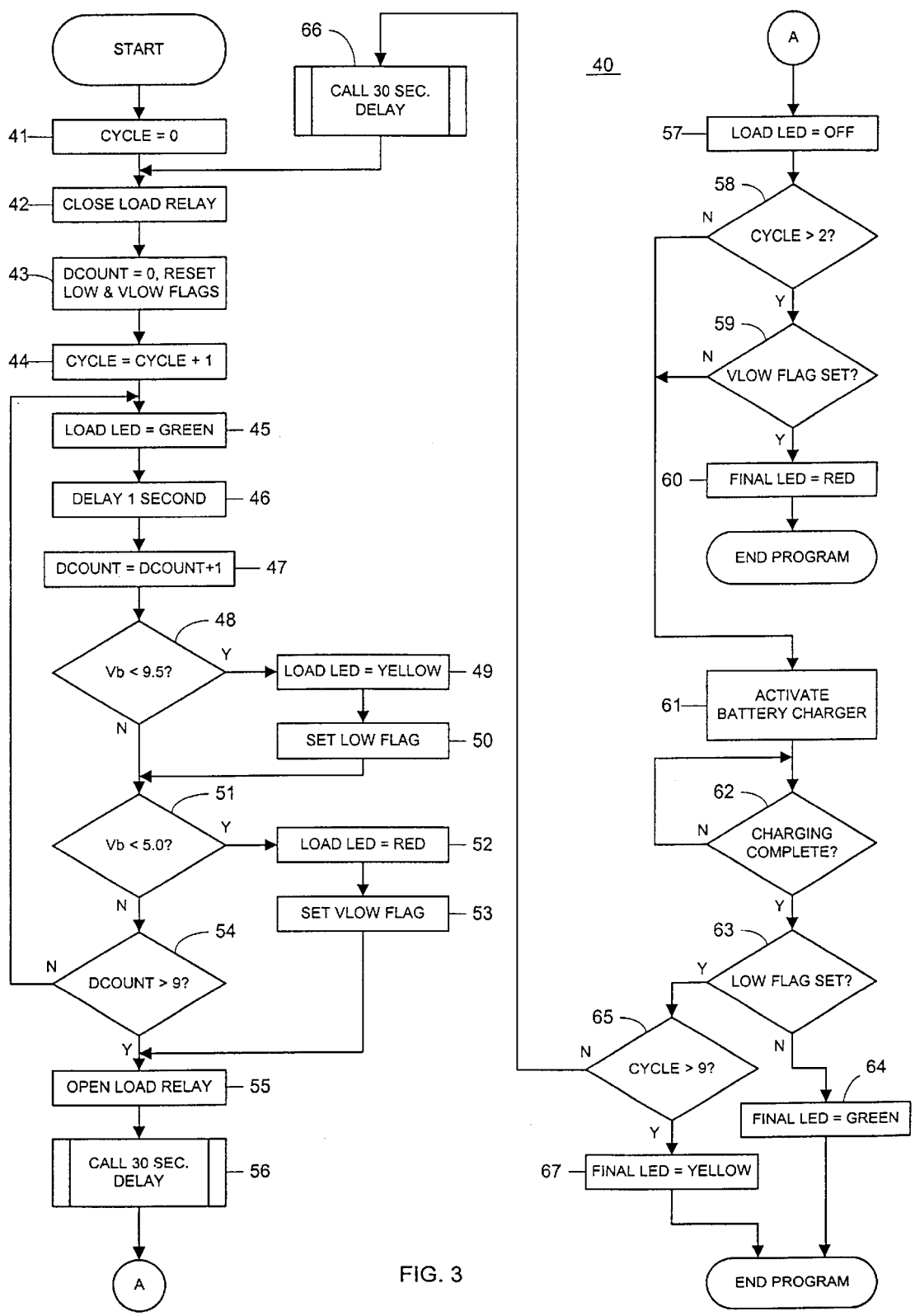
FIG. 3 is a flow chart of the program routine for the microprocessor of the system of FIG. 1.

Referring to FIG. 3, there is illustrated a flow chart of the program routine executed by the microprocessor 15, and generally designated by the numeral 40. At the start, when the system is turned on, the routine first, at 41, sets CYCLE equal to zero and then, at 42, closes the load relay switch 18, connecting the load 17 across the battery 11, and then, at 43, establishes DCOUNT equal to zero and resets LOW and VLOW flags. Then, at 44, increments CYCLE by 1 and then, at 45, turns on the load indicator, such as by illuminating a green LED in the array 19*a* signifying that the loading cycle is operating, and that the battery terminal voltage has not yet dropped below any reference levels. Then, at 46, the routine delays one second and then, at 47 increments DCOUNT by one, DCOUNT representing the time in seconds that the load has been connected to the battery in the current loading cycle.

Next, at 48, the routine checks to see if the battery terminal voltage has dropped below the predetermined reference voltage level 28, i.e., 9.5 volts in the illustrated example. If it has, the load indicator is changed to yellow at 49 and then the LOW flag is set at 50. Then, at 51, the routine checks to see if the battery terminal voltage has dropped below the absolute minimum voltage level 23, i.e., in the illustrated example 5.0 volts. The routine proceeds directly to 51 from 48 if, at 48, the battery terminal voltage is not below the first reference level. If, at 51, the battery terminal voltage is below the absolute minimum value the routine then sets the load indicator to red at 52, and sets the VLOW flag at 53. If, at 51, the battery terminal voltage is not below 5.0 volts, the routine then checks at 55 to see of DCOUNT is greater than 9. If it is not, the routine returns to 45 to continue the loading cycle. If, at 54, DCOUNT is greater than 9, this means that the loading cycle has lasted for the predetermined time period, in this case 10 seconds, so the routine then proceeds to 55 to open the load relay switch 18 and disconnect the load 17 from the battery. The routine goes directly to 55 from 53. After the load is disconnected, the routine waits for a 30-second delay period at 56 and then turns off the load indicator at 57.

The program then checks at 58 to see if the current loading cycle is at least the third such cycle. If so, the program then checks at 59 to see if the VLOW flag is set and, if it is, indicating that the battery terminal voltage is below the absolute minimum voltage level 23, the program then moves to 60 to set the battery condition or final indicator to red, indicating that the battery should be discarded, whereupon the program is ended.

If, at 58, the current loading cycle is less than a third or, at 59 the VLOW flag is not set, the program then proceeds to 61 to activate the battery charger 14 and then checks at 62 to see if the charging is complete, i.e., the charger is turned off, and continues checking for this condition. When the charging is complete, the routine checks at 63 to see if the LOW flag is set, indicating that during the preceding loading cycle the battery terminal voltage had dropped below the predetermined reference level 28. If not, the battery condition indicator is set to green at 64 indicating that the battery is good, and the program is ended. If, at 63, the LOW flag is set, the program checks at 65 to see if this is the tenth loading cycle. If not, it waits another 30-second delay period at 66, and returns to 42 to start another loading cycle. If, at 65, the current loading cycle is the tenth, the routine sets the battery condition indicator to yellow at 67, indicating that the battery voltage has remained below the reference level 28 for 10 consecutive loading cycles, so that the battery has failed the test, but could be eligible for further testing. Then the program is ended.

While, in the illustrated embodiment, the nominal full-charge level 25, the threshold level 28 and the absolute minimum level 23 are, respectively, designated as 13.0 volts, 9.5 volts and 5.0 volts, it will be appreciated that this is simply for purposes of illustration, and that different voltage levels could be used, depending upon the particular application. Similarly, the loading time t may be varied, as desired. While, in the illustrated embodiment, the load 17 is fixed, it will be appreciated that a variable load could be utilized, in which case the variation could be under the control of the microprocessor 15, as indicated by the dotted line 35 in FIG. 1.

From the foregoing, it can be seen that there has been provided an improved battery charging system which is capable of maintaining and rejuvenating lead-acid batteries.

The matter set forth in the foregoing description and accompanying drawings is offered by way of illustration only and not as a limitation. While a particular embodiment has been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

I claim:

1. A battery testing and charge maintenance system for a lead-acid battery comprising:
   a charger circuit adapted to be coupled to the battery,
   a load and a switching device adapted to be connected in series across the battery,
   a voltage monitor circuit adapted to be coupled to the battery for monitoring the terminal voltage thereof, and
   a processor coupled to the charger circuit and to the switching device and to the monitor circuit and responsive to battery terminal voltage for controlling operation of the charger circuit and the switching device;
   the processor operating under stored program control for subjecting the battery to at least one loading cycle with each loading cycle subsequent to a first loading cycle being preceded by a charging cycle until a predetermined battery voltage criterion is met.

2. The system of claim 1, wherein the processor includes a program routine which subjects the battery to alternate loading and charging cycles until at least one of plural battery voltage criteria is met.

3. The system of claim 2, wherein the program routine includes a portion establishing a first voltage criterion that the lowest battery terminal voltage occurring during the loading cycle is equal to or greater than a first predetermined reference voltage level.

4. The system of claim 3, wherein the program routine includes a portion establishing a second voltage criterion that the lowest battery terminal voltage occurring during a loading cycle has remained below the first predetermined reference voltage level for ten consecutive loading cycles.

5. The system of claim 3, wherein the program routine includes a portion establishing a third voltage criterion that the lowest battery terminal voltage occurring during a loading cycle is below a second predetermined voltage level after three consecutive loading cycles.

6. The system of claim 1, wherein the processor includes a timing program routine for establishing a predetermined time period for each loading cycle.

7. The system of claim 6, wherein the processor includes a program routine which maintains each loading cycle until expiration of the predetermined time period or until the battery terminal voltage drops below a predetermined absolute minimum voltage level, whichever occurs first.

8. The system of claim 1, wherein the processor includes a program routine having a timing portion which introduces a predetermined delay period between adjacent loading and charging cycles.

9. The system of claim 1, and further comprising a load indicator for indicating the status of the loading cycle and a battery condition indicator.

10. The system of claim 9, wherein the load indicator is operative during a loading cycle and indicates whether or not the battery terminal voltage has dropped below predetermined reference levels.

11. The system of claim 9, wherein the battery condition indicator is operative at the conclusion of a final charging cycle to indicate whether the battery (a) is good, (b) failed the cycling test but may be subject to further testing, or (c) should be discarded.

12. The system of claim 9, wherein the battery condition indicator is operative at the conclusion of a final charging cycle to indicate whether the battery (a) is good, or (b) should be discarded.

13. A method for maintaining and/or reconditioning a lead-acid battery comprising:
   subjecting the battery to at least one loading cycle,
   monitoring the battery terminal voltage during each loading cycle,
   storing the lowest battery terminal voltage level occurring during each loading cycle,
   subjecting the battery to a charging cycle prior to each loading cycle subsequent to a first loading cycle,
   after each loading cycle comparing the stored lowest battery terminal voltage level during that loading cycle with at least one predetermined reference voltage level, and
   determining, based on the results of each comparison, whether or not to subject the battery to further charging or loading cycles.

14. The method of claim 13, wherein the battery is subjected to a loading cycle for a predetermined time period.

15. The method of claim 14, wherein the loading cycle is maintained for the predetermined time period or until the battery terminal voltage drops below a predetermined absolute minimum voltage level, whichever occurs first.

16. The method of claim 13, wherein a loading cycle is not repeated if, as a result of the comparing step, the stored lowest battery terminal voltage level is equal to or greater than a first predetermined reference voltage level.

17. The method of claim 16, wherein a loading cycle is not repeated if, as a result of the comparing step, the stored lowest battery terminal voltage level has remained below the first predetermined reference voltage level for ten consecutive loading cycles.

18. The method of claim 16, wherein a loading cycle is not repeated if, as a result of the comparing step, the stored lowest battery terminal voltage level is below a second predetermined absolute minimum reference voltage level and the battery has been subjected to three consecutive loading cycles.

19. The method of claim 13, and further comprising providing a first indication of the state of the battery terminal voltage during a loading cycle and a second indication of the condition of the battery after a final charging cycle.

20. The method of claim 13, wherein the battery is subjected to a charging cycle after each loading cycle.

* * * * *